United States Patent [19]

Skybyk

[11] Patent Number: 5,334,898
[45] Date of Patent: Aug. 2, 1994

[54] POLYPHASE BRUSHLESS DC AND AC SYNCHRONOUS MACHINES

[76] Inventor: Dymytro Skybyk, 340 Evans St., Williamsville, N.Y. 14221

[21] Appl. No.: 968,870

[22] Filed: Oct. 30, 1992

Related U.S. Application Data

[63] Continuation-in-part of Ser. No. 769,355, Sep. 30, 1991, Pat. No. 5,216,339.

[51] Int. Cl.⁵ ............................................... H02K 1/22
[52] U.S. Cl. ................................... 310/268; 310/114; 310/164
[58] Field of Search ............... 310/112, 114, 121, 126, 310/127, 52, 68 C, 68 B, 68 A, 268, 64, 164, 266

[56] References Cited

U.S. PATENT DOCUMENTS

| | | |
|---|---|---|
| 2,719,931 | 10/1955 | Kober . |
| 2,873,395 | 2/1959 | Kober . |
| 3,394,276 | 7/1968 | Cafici . |
| 3,524,250 | 8/1970 | Burr ................................. 310/268 |
| 3,906,267 | 9/1975 | Coupin et al. . |
| 3,922,574 | 11/1975 | Whiteley . |
| 3,979,619 | 9/1976 | Whiteley . |
| 3,999,092 | 12/1976 | Whiteley . |
| 4,006,375 | 2/1977 | Lyman, Jr. et al. . |
| 4,020,372 | 4/1977 | Whiteley ..................... 310/268 X |
| 4,034,614 | 8/1977 | Lyman . |
| 4,187,441 | 2/1980 | Oney . |
| 4,188,556 | 2/1980 | Hahn . |
| 4,234,838 | 11/1980 | Langley et al. . |
| 4,237,396 | 12/1980 | Blenkinsop et al. ............. 310/268 X |
| 4,484,097 | 11/1984 | Kanayama et al. . |
| 4,536,672 | 8/1985 | Kanayama et al. . |
| 4,563,606 | 1/1986 | Fukasawa et al. ............. 310/164 X |
| 4,568,862 | 2/1986 | Tassinario . |
| 4,629,920 | 12/1986 | Hermann . |
| 4,633,149 | 12/1986 | Welterlin . |
| 4,803,387 | 2/1989 | Seider . |
| 4,814,651 | 3/1989 | Elris et al. . |
| 4,882,524 | 11/1989 | Lee . |
| 4,996,457 | 2/1991 | Hawsey et al. ................. 310/268 |
| 5,099,182 | 3/1992 | Isaacson et al. . |

Primary Examiner—Steven L. Stephan
Assistant Examiner—E. To
Attorney, Agent, or Firm—Richard C. Litman

[57] ABSTRACT

This invention relates to high-density discoidal brushless induction open frame motors and generators with multistacking, multiphasing and multistaging capability. These motors may be in the range from 20 hp to 1,000 hp, 25,000 hp or more and these generators may range from a few kW to 1,000 kVA, 25,000 kVA or 100,000 kVA. Rare earth permanent magnets are arranged about a disk shaped rotor. A unique rectangular toroidal stator element serves as the mounting for numerous flat wound armature coils. The heat generated by the high flux and current densities is dissipated by a liquid cooling arrangement built into the toroidal stator element. The absence of the need to use the frame as a flux return path allows light weight aluminum to be used without a loss in efficiency. The open frame structure allows for easy cascading of multiple units along the same shaft for higher capacity.

20 Claims, 16 Drawing Sheets

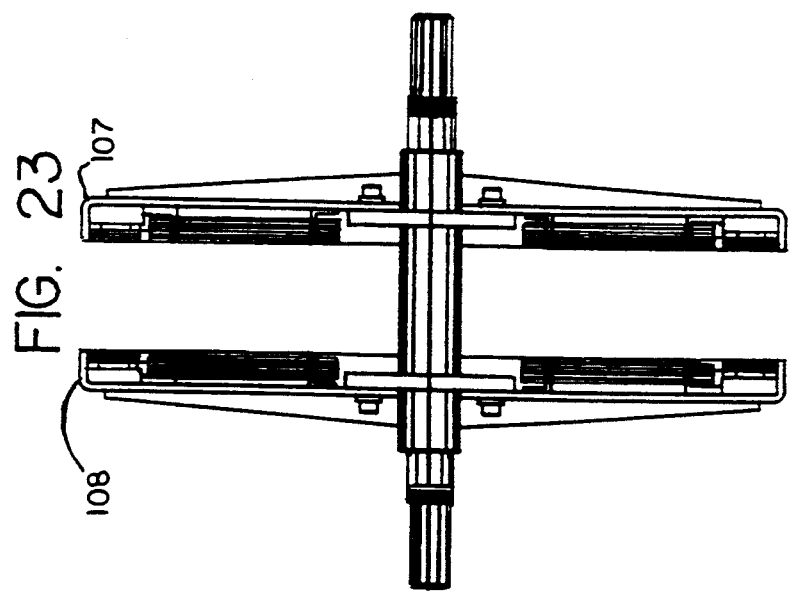
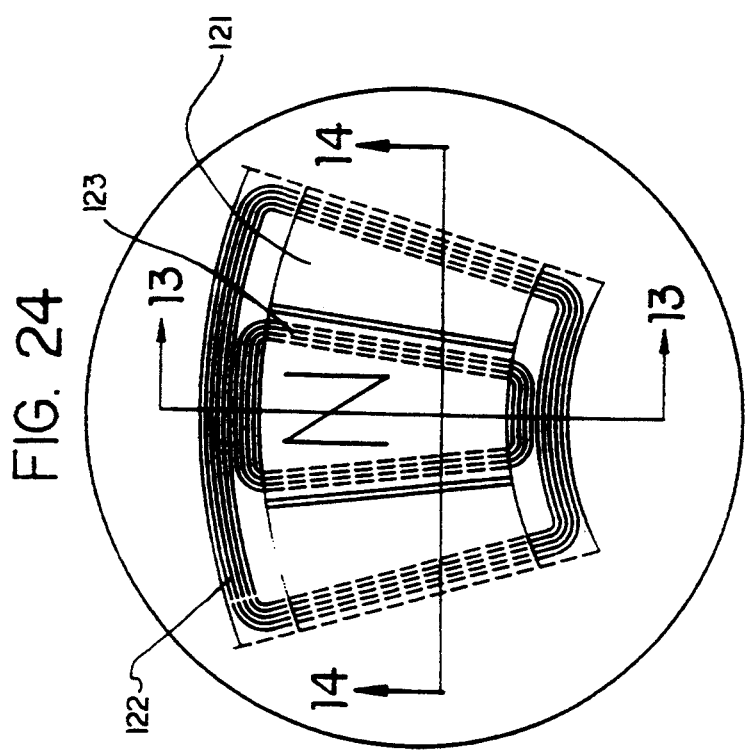
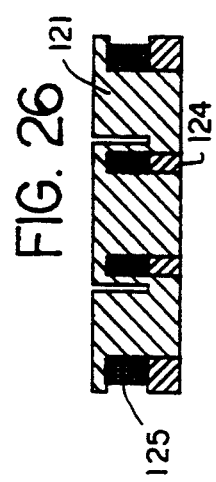

POLYPHASE BRUSHLESS DC AND AC SYNCHRONOUS MACHINES

REFERENCE TO RELATED APPLICATION

This application is a Continuation-In-Part of U.S. patent application Ser. No. 07/769,355 filed on Sep. 30, 1991, now U.S. Pat. No. 5,216,339.

BACKGROUND OF THE INVENTION

1. FIELD OF THE INVENTION

The present invention relates to discoidal polyphase brushless DC synchronous motors and generators, polyphase AC synchronous motors, polyphase AC synchronous induction motors and generators and polyphase AC induction motors with a radial rotor cage. The above polyphase brushless DC and AC synchronous machines are based on an inverted stator/rotor configuration with an open frame structure for high capacity.

Polyphase brushless DC and AC synchronous motors/generators are characterized by a discoidal single or dual rotor, armature coil windings, coils being wound in rectangles around a laminated core or cores of a single or dual stator with every third, fourth, fifth or sixth coil connected into a series/parallel polyphase configuration on the periphery of the stator with alternating polarity facing alternating field poles on the rotor and separated by a minimal axial air gap between the stator and the rotor.

2. DESCRIPTION OF THE PRIOR ART

Conventional DC machines with a wound rotor and wound field poles or with permanent magnet field poles require brush type commutations, are relatively heavy, have a large size per unit of power and require constant maintenance with high operating costs. Brush type DC motors are gradually being replaced by more advanced brushless DC motors or AC induction motors with variable frequency controllers.

Almost 80% of three-phase AC synchronous and induction squirrel cage motors and generators are used in industrial and commercial applications, in hydroelectric power generating stations, and in mobile diesel or turbogenerating power units with relatively low maintenance and operating costs. However, they are not without their drawbacks since machines with higher power ratings have higher power losses and have an increased size and weight per unit of power due to the larger size in the frame structure needed for magnetic flux circulation and heat dissipation for the relatively high current carrying capacity of heavy copper conductor machines. The efficiency of a large machine is directly related to the machine design characteristics, power losses, iron core losses, copper losses, windage losses, stray losses and :heat ($I^2R$) losses. The inclusion of DC and AC inverter and frequency controllers raise the maintenance and operating costs and cause higher power losses.

SUMMARY OF THE INVENTION

Polyphase brushless DC and AC synchronous machines have been developed to increase the overall energy efficiency, reduce the size and weight and increase the amount of horsepower per pound over conventional DC or AC machines of higher power ratings.

Two types of polyphase discoidal brushless DC machines have been developed. One machine consists of a dual stator and a single rotor and the second machine consists of a single stator with a dual rotor. Although they have similar frame structures and identical operation, each of the machines has different characteristics and different advantages and disadvantages.

The machine with a single stator contains twice the amount of copper conductors with the same amount of iron while the dual stator contains half the amount of copper conductors with the same amount of iron as the first machine, however, the effective core length in both machines is the same with the same number of armature coils and the same number of amperes per turn. Both machines would operate as a motor or a generator or a combination of both a generator and a motor, however, the single stator machine would operate at a higher efficiency as a generator while the dual stator machine would operate at a higher efficiency as a motor with a higher differential factor.

The discoidal open frame structure concept would reduce manufacturing, maintenance and operating costs and al low interchangeability of individual components. The discoidal open frame structure is based on the modular concept which can be expanded axially and radially. By allowing multistacking of two machines, up to 10 or 20 individual stator and rotor assemblies in parallel on a single or dual output shaft. The torque of the individual stages would be multiplied by the number of stages in the machine with only a 30% increase in size and weight per stage with a 100% increase in the torque per number of stages. In the discoidal machine concept, the stators and the rotors are positioned perpendicular to the axis of rotation and the magnetic flux circulation and magnetic interaction between the rotor's field poles and the stator's armature coils is parallel to the axis of rotation with the conventional iron frame structure being replaced by an aluminum motor frame structure with a higher heat dissipation and with a weight reduction in half. However, polyphase brushless DC or AC synchronous motors or generators of a two or more stator/rotor configuration with a high concentration of armature coils and a high number of amperes per turn coil on both sides of the stator face each rotor disk with a large surface area of permanent magnet field poles.

When a current is applied to the armature coils in the stators, a very high magnetic flux density is generated per unit of area within the axial air gap such that the magnetic reactive force produces a very high torque or induces a very high current in the armature coils if used as a generator. The total output torque is multiplied by the number of stages which may be two, three or more times higher than the total output torque of any conventional motors or generators.

In a highly concentrated area of stators or rotors and a high number of amperes per turn in the armature coils, a large amount of heat would be generated within the armature coils and the stator core, which leads to high power losses. To reduce the heat buildup, the single or dual stator is mounted directly on a liquid or air cooled heat sink which dissipates most of the heat generated by the armature coils and the lamination core while the remaining heat is rapidly dissipated through the aluminum frame structure. In the larger motor/generator unit, small integrated hydraulic pumps are added to the shaft for recirculation of the cooling fluid, which may be water if water is available, with a cooling condenser on top of the units with automatic controls to regulate the cooling condenser's cooling and fluid flow capacity.

The polyphase brushless DC and AC synchronous machine consists of at least a dual stator with a dual rotor or a single stator with a dual rotor separated by a minimal axial air gap on each side of the stator. In the single stator configuration, the armature coils are wound at a 90 degree angle across the laminated core with both ends of the coil wire extended to the outside of the stator core assembly with the stator assembly then mounted or bolted on a liquid or air cooled aluminum heat sink which is part of the frame structure. In the dual stator configuration, the two laminated cores are mounted directly on a liquid or air cooled aluminum heat sink with the armature coils wound at a 90 degree angle across both of the laminated cores and the heat sink with interleaved heat insulation between each layer of multiple coil turns of copper conductors to reduce the heat buildup in the coil. The number of turns per coil is not limited by the frame structure but is rather limited by the size and depth of the slots.

A premanufactured discoidal single or dual stator assembly at this stage is prewound instead of wired or interconnected. Once a specific design parameter has been chosen, then the stator assembly would be wired into combination in a polyphase brushless DC motor, a polyphase brush less De synchronous motor, a polyphase AC synchronous motor, a polyphase AC synchronous induct ion motor or a polyphase induction motor with a radial cage rotor. For each of the above motor design parameters, a specific single or dual rotor assembly is needed to match the specific number of sizes and strengths of rare earth permanent magnet field pairs of poles, lower grade ceramic permanent magnets or prewound DC self-excited field pairs of poles with single or dual field pole windings on the rotor for a specific size of motor or generator characteristics.

Each phase in the polyphase motor combination is connected in parallel to an external DC or AC power source through solid state power switches sequentially controlled by a chopper, PWM or AC frequency controller commercially available for variable torque and speed controls. A polyphase brushless DC synchronous motor with incremental motion control is related to the value of the phase angle position characteristics between the armature coil position and the angular position of the field pole. The DC motor torque is independent of both the rotor's angular position and of the load and is only dependent on the current in the armature coils. In polyphase brushless DC machines, the coil field of the polyphase are added vectorially with 75% of the coils in the armature in the conducting state and the remaining 25% of the coils switching the current polarity sequentially between each phase. The higher the number of conducting armature coils per phase, the higher the torque that could be achieved with this phase per pole power characteristic.

There are two types of torque control, multiphase and multistage controls. In multiphase controls, each phase is connected in parallel through solid state power switches to the main power supply and sequentially switched on or off by a chopper control circuit or an AC variable frequency controller. The current through each phase will develop a torque proportional to the magnitude of current through each armature coil in the phase. By switching on or off each phase individually the output torque will be increased or decreased proportionally, for example, a five-phase dual stage motor would have the capability of five different output torques of 20, 40, 60, 80 or 100 hp.

By multistacking two or more stages on a single shaft, each stage could be switched on or off whenever a higher or lower output torque is needed. A four-stage motor would consist of a dual stage and two single stages with two dual rotors. In a multimode operation, a dual stator could be switched on or off. If each stage would develop 50 hp per stage or a total of 200 hp, the motor would require 150 kW of electric energy, The motor would operate at 50, 100, 150 or 200 hp maximum. Switching the output torque manually or automatically with overload sensors would save large amounts of energy in multimode operation whenever a higher or a lower output torque is needed.

For a rotor consisting of one low carbon steel disk with a 90 degree flange on the outside of the rotor disk, the flange width is equal to the thickness of the ceramic or rare earth permanent magnet field poles. Permanent magnet field poles are of a polygonal pie shape configuration where the size, thickness, spacing and number of poles within the rotor disk are determined by the size of the stators and the number of armature coils and the overall parameter of the machine and output torque. Each permanent magnet field pole is assembled with an alternating polarity next to each other separated by an aluminum cage plate and secured within the rotor disk flange.

A dual rotor disk consists of two single rotor assemblies assembled back to back and riveted together with the permanent magnet field poles facing out such that each single rotor is offset by the width of a permanent magnet field pole such that each pole in one rotor is positioned exactly over a pole of the second rotor with alternating polarity. As a complete assembly, each single or dual rotor is balanced for the rotational speed of 5,000 rpm or higher. The higher cost of the rare earth permanent magnet is offset by the lower manufacturing cost of the rotor in this configuration.

There is a limit in the manufacturing and handling of a large size permanent magnet without breaking or cracking the permanent magnet. The larger sizes of a permanent magnet could be assembled from smaller pieces into a magnetic stainless steel shell and assembled on the rotor disk for large polyphase brushless DC or AC synchronous motors and generators beyond the conventional permanent magnet size manufacturing capability. A discoidal rotor with prewound DC self-excited single or dual field pole windings will provide the necessary current for field pole excitation of a polyphase brush less DC or AC synchronous motors and generators. A discoidal radial cage rotor with premanufactured laminated disk assembly aluminum cross bars and end rings assembled within a low carbon steel rotor disk is to be used with discoidal single or polyphase induction motors.

In a conventional three-phase AC synchronous induction machine system with an inverted stator/rotor configuration, the armature coils are stationary on the stator and the excited DC field poles are mounted on the rotor similar to the configuration of a polyphase brushless DC synchronous machine. In reality, there is no change in the basic principle of operation of the three-phase AC synchronous induction machine of a cylindrical or discoidal frame structure. The discoidal open frame structure has advantages in the cross lamination windings, removing the restriction in the number of amperes per turn per coil and connecting the armature coils between the slots instead of the windings with the discoidal configuration allowing multistacking of two or more stators on a single shaft without affecting the effective core length.

The discoidal single or dual stator assembly is mounted on a liquid or air cooled aluminum heat sink reducing the heat at the heat source of the armature coils and the laminated cores which otherwise is very difficult to reduce. A higher concentration of multistage assemblies and a higher number of amperes per turn would increase considerably the overall output torque or generating capacity and reduce the overall frame structure in size and weight by half compared to any conventional machines of the same power ratings. Energy losses may be reduced in lower power rating machines by replacing the DC excited field poles by rare earth permanent magnets on the rotor disk of lower power rating machines. However, larger sizes of AC synchronous machines would have to use discoidal prewound DC self-excited field poles on the rotor disks. The discoidal open frame structure has the advantage that the rotors and stators could be premanufactured and used in modular DC or AC motor applications with interchangeability of most of the components of the same power ratings.

In general, three-phase AC synchronous induction machines operate at a higher efficiency as motors and generators although in some applications, where a higher flexibility in shaft speed may be needed, such machines are restricted by the synchronous speed in which the revolving flux is directly proportional to the frequency of the supply voltage and is inversely proportional to the number of pairs of poles. The shaft speed of the three-phase synchronous AC machines is feasible with various phase inverters and frequency controllers which increase the costs and power losses. To change the three-phase AC synchronous induct ion machine operating characteristics, the inverse shaft speed proportionality to the number of pairs of poles and to the frequency of the supply voltage would require a machine designer to change the three-phase closed loop system into a polyphase open loop system by connecting the three-phase "Y" closed loop to a neutral or common return of a three-phase four-wire system.

When a closed-loop system is open, the conduction is no longer between phases but rather between each phase and a common return as happens in a three-phase stem. By connecting the three-phase common point to a four-wire system, the revolving flux would be canceled and no longer exist. Therefore, the shaft speed would be proportional to the frequency of the supply voltage and not to the synchronous speed or the revolving flux since the revolving flux no longer exists. In a polyphase four-wire system, all phases are equal to each other with an equal current flow and an equal magnetic flux generated by the armature coils, the number of armature coils and the amperes per turn per coil identical to polyphase brushless DC synchronous machines with the difference in the sequential switching of each phase either by an AC variable frequency controller synchronized with the frequency of the supply voltage or an inverted AC to DC current operated by solid state chopper control circuits.

The discoidal machine design is based on the modular concept of an annular toroidal stator core assembly mounted on a flat aluminum heat sink and a rotor field pole structure assembly mounted on a low carbon steel or an aluminum rotor disk perpendicular to the axis of rotation with axial magnetic flux circulation between the stators and the rotor field poles enclosed within the magnetic flux path or the modular toroidal structure parallel to the axis of rotation, The stator assembly may be attached to the internal or external support structure and the rotor disk could be attached internally to a shaft, an internal cylinder or an external cylinder. The annular toroidal structure could be designed and manufactured in a wide variety of sizes and shapes with magnetic frictionless bearings which would eliminate friction and lubrication on a large rotating structure ranging from a one foot inside diameter six inch long open end cylinder.

The annular toroidal structure could be expanded axially into a multistage configuration and radially without expanding the apparent length of the stator and rotor field pole structure. Large annular disk machines could be assembled of premanufactured sections and assembled into a large annular machine frame structure. Stators can be made of shorter sections spaced 120 degrees apart and serve as a support structure for the rotor. Annular shaftless machines could be of polyphase brushless DC or AC synchronous motors or generators with permanent magnet field poles or prewound DC self-excited rotors.

Accordingly, it is a principal object of the invention to provide a high torque lateral brushless induction open frame generator.

It is another object of the invention to provide a cross-lamination brushless induction multiphase AC generator with cross-lamination windings, liquid cooling, a single rotor and a dual stator where each half of the stator has a set of coils and where the dual stator and the single rotor of this generator may be combined with the dual stator and the single rotor of one or more similar generators to create a single multistage generator.

It is a further object of the invention to provide cross-lamination brushless induction multiphase DC generator with cross-lamination windings, liquid cooling, a single rotor and a stator where each half of the stator has a set of coils and where the dual stator and the rotor of this generator may be combined with the dual stator and the single rotor of one or more similar generators to create a single multistage generator.

Still another object of the invention is to provide a cross-lamination brushless induction multiphase AC motor with cross-lamination windings, liquid cooling, a dual rotor and a single stator where the stator has a set of coils and where the single stator and the dual rotor may be combined with the single stator and the dual rotor of one or more similar motors to create a single multistage motor.

Yet another object of the invention is to provide a cross-lamination brushless induction multiphase DC motor with cross-lamination windings, liquid cooling, a dual rotor and a single stator where the single stator has a set of coils and where the single stator and the dual rotor of this motor may be combined with the single stator and the dual rotor of one or more similar motors to create a single multistage motor.

It is an object of the invention to provide improved elements and arrangements thereof in an apparatus for the purpose described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 23 is a cross-sectional view taken along line 12—12 of FIG. 20 showing a front view of the dual rotor with self-excited DC field poles;

FIG. 24 is an enlarged view of the encircled portion of FIG. 20 showing detail of a self-excited DC field pole;

FIG. 26 is a cross-sectional view taken along line 14—14 of FIG. 24 showing a bottom detail view of a self-excited DC field pole;

Similar reference characters denote corresponding features consistently throughout the attached drawings.

DETAILED DESCRIPTION OF THE PREFERRED EMBODIMENTS

Figure 1:
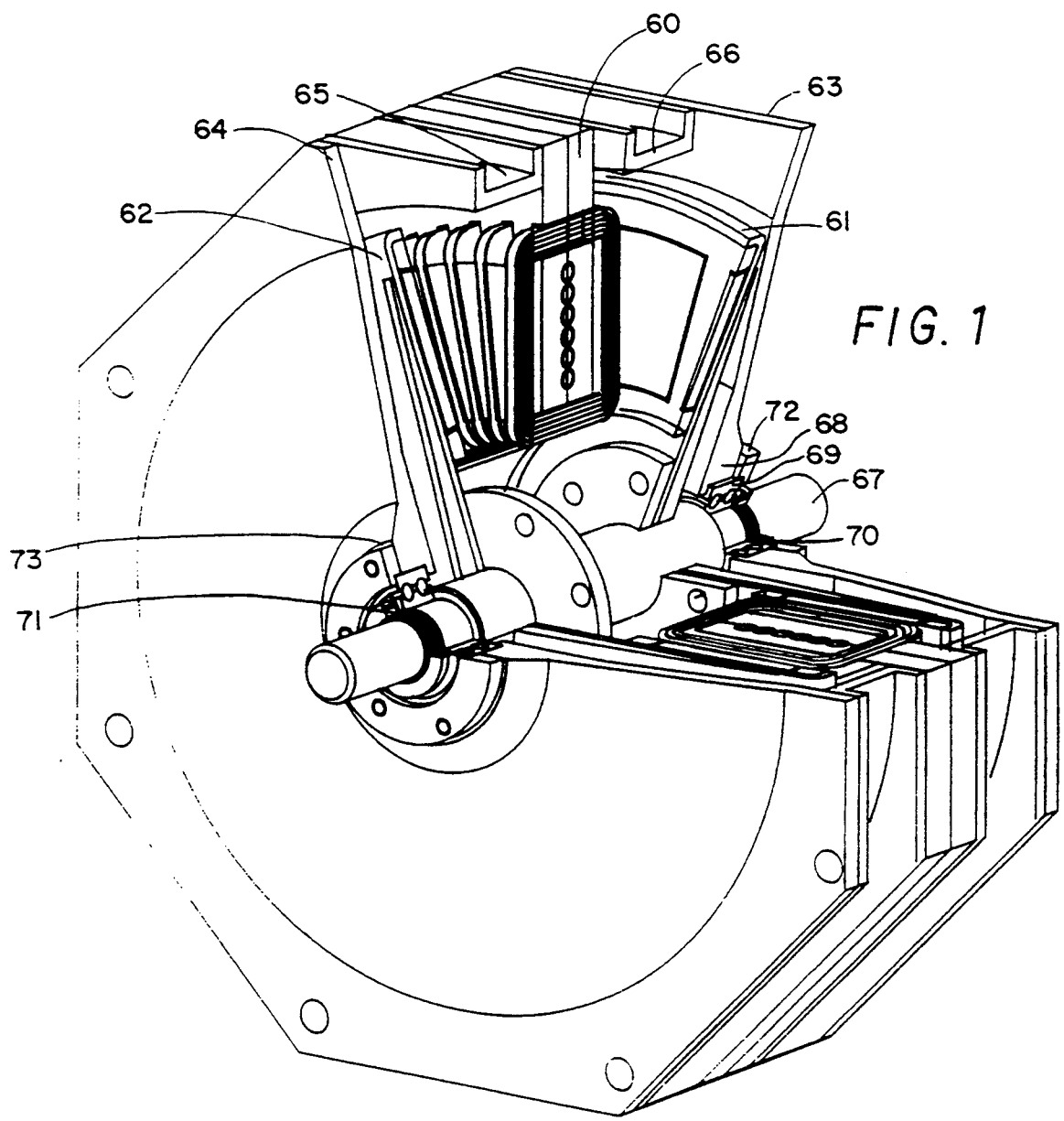
FIG. 1 is a perspective view of a polyphase discoidal brushless DC synchronous motor with a partial cutaway exposing internal components of an octagonal single stator with multiple armature coils and a dual rotor with multiple rare earth permanent magnet field poles assembled on one side of each rotor disk.
Figure 3:
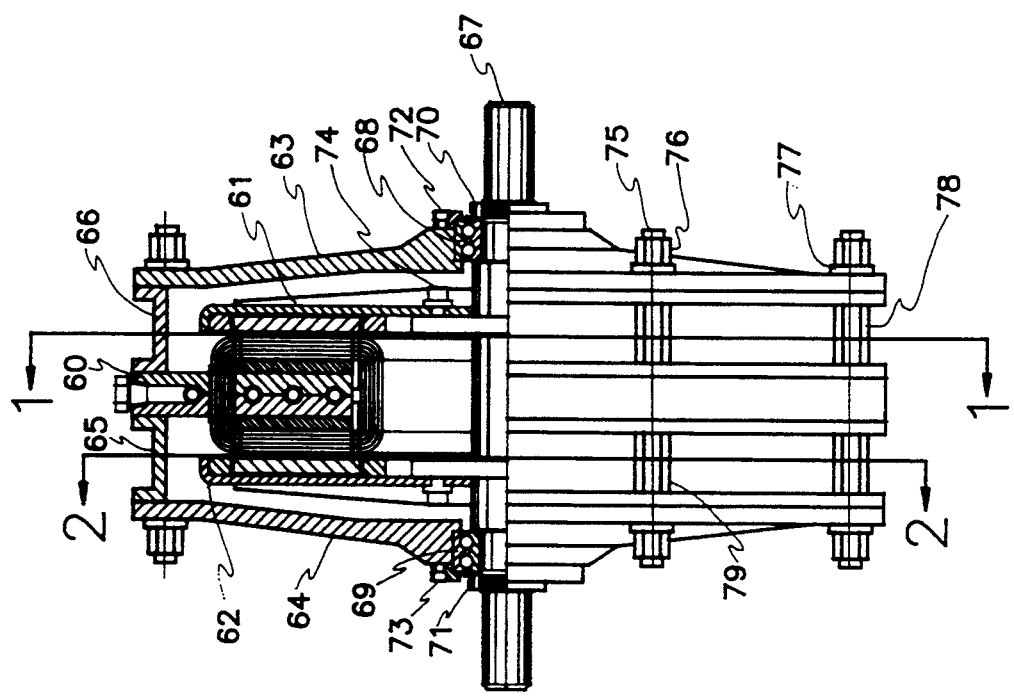
FIG. 3 is a front view of the polyphase discoidal brushless DC synchronous motor with a partial cutaway exposing internal components of two end housing plates, a dual rotor assembly and a central single stator assembly.
Figure 2:
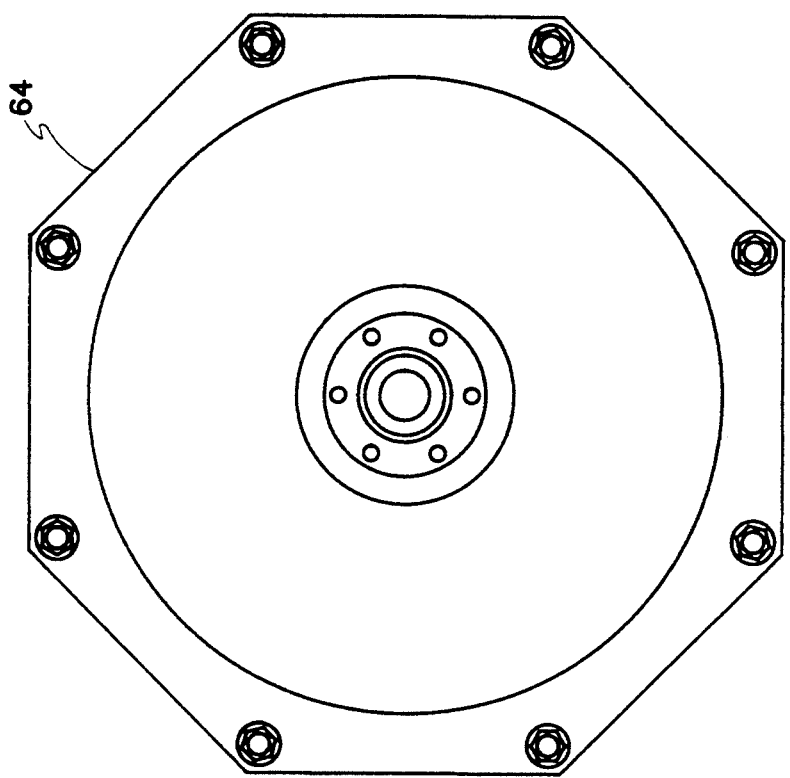
FIG. 2 is a side view of the polyphase discoidal brushless DC synchronous motor.

The present invention relates to motors and generators built using the discoidal open frame structure. A discoidal brushless DC synchronous machine is shown in FIG. 1 in perspective with a partial cutaway exposing internal components of a single stator assembly 60, a dual rotor assembly 61, 62, a first housing end plate 63, a second housing end plate 64, a first spacer channel 65, a second spacer channel 66, a shaft 67, two ball bearings 68 and 69, two bearing nuts 70 and 71 with washers and two bearing flange plates 72 and 73. The two housing end plates 63, 64 are octagonal aluminum end plates which are supported by two shaft bearings 68, 69 with two bearing flange plates 72, 73 holding the bearings 68, 69 against the first and second housing end plates 63, 64 with lock nuts 70, 71 holding the bearing against the shoulder of the shaft 67. The first and second rotor disk assemblies 61, 62 are bolted to the outside face of the shaft flanges with the rotor disks' permanent magnet field poles facing toward the stator assembly 60 and with the rotor disks 61, 62 separated from the stator assembly 60 by an axial minimal air gap. The air gap is predetermined by the shaft shoulder length and the outer spacer channels 65, 66 are premanufactured to a specific length that would leave an equal air gap on both sides of the stator assembly 60. Additional shims may be added between the shaft shoulder and the bearings 68, 69 and the outer spacer channels 65, 66. Aluminum end plates 63, 64 may be round or octagonal as shown in FIG. 2, where small motors would have round end plates and larger motors would have octagonal end plates bolted together with shoulder studs 75, 78 and 79, lock washers 77 and nuts 76 as shown in FIG. 3.

Figure 5:
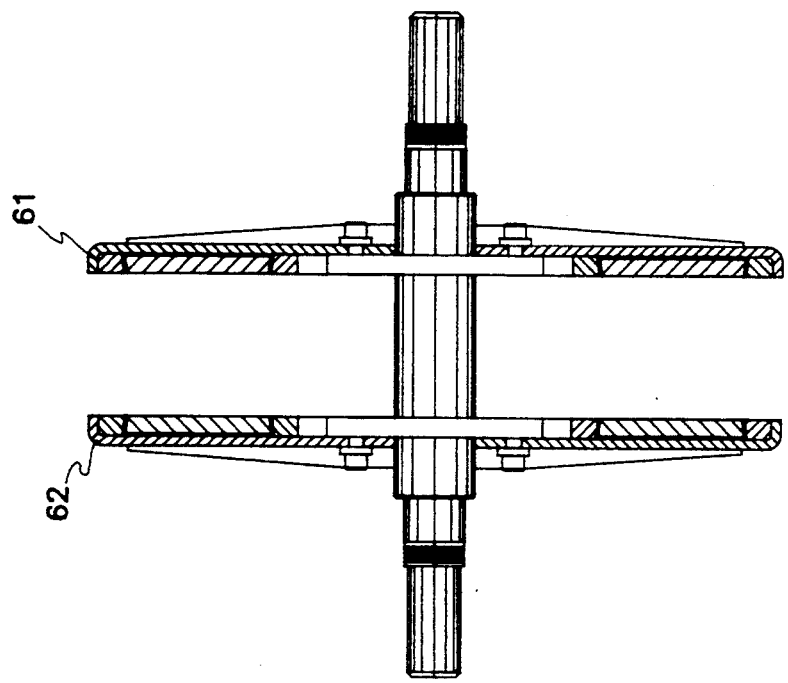
FIG. 5 is a cross-sectional view taken along line 3—3 of FIG. 4 showing a front view of the dual rotor assembly.
Figure 4:
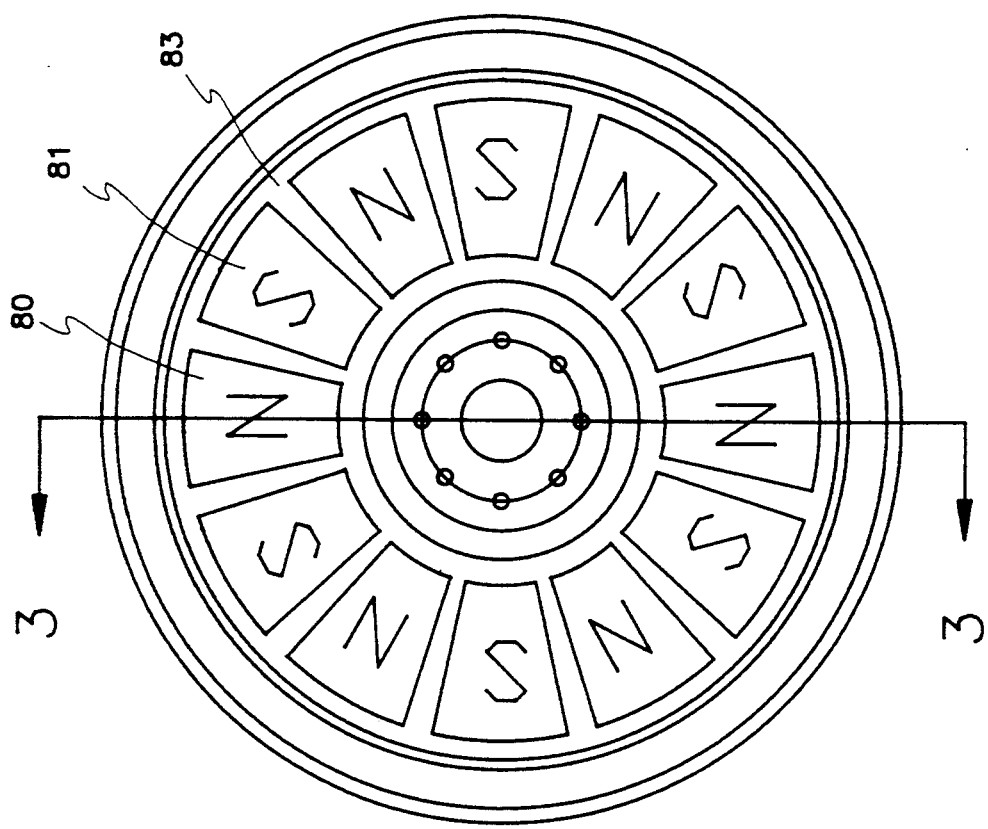
FIG. 4 is a cross-sectional view taken along line 1—1 of FIG. 3 showing a side view of one-half of the rotor disk assembly with permanent magnet field poles and a radial cage rotor for the polyphase discoidal brushless DC synchronous motor.
Figure 6:
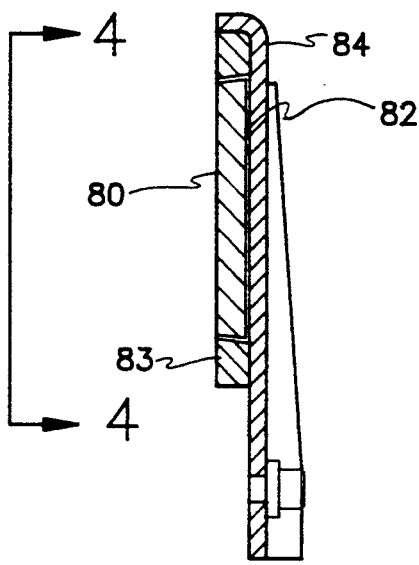
FIG. 6 is an enlarged view of the encircled portion of FIG.
Figure 7:
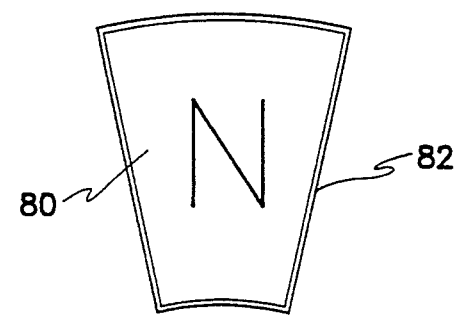
FIG. 7 is a cross-sectional view taken a long line 4—4 of FIG. 6 showing detail of a permanent magnet field pole of the polyphase discoidal brushless DC synchronous motor.
Figure 8:
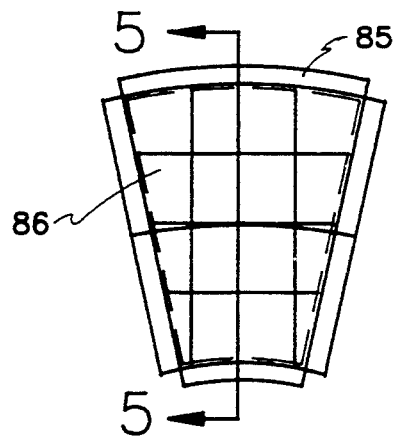
FIG. 8 is an enlarged view of the permanent magnet field pole showing detail of the dimensions of the permanent magnet field pole of FIG. 7.
Figure 9:
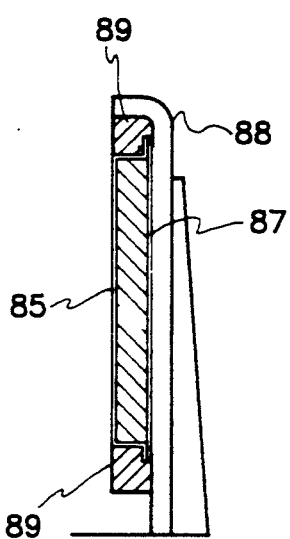
FIG. 9 is a cross-sectional view taken along line 5—5 of FIG. 8 showing an enlarged view of FIG. 6 showing greater detail of how a permanent magnet field pole fits onto the dual rotor assembly.
Figure 11:
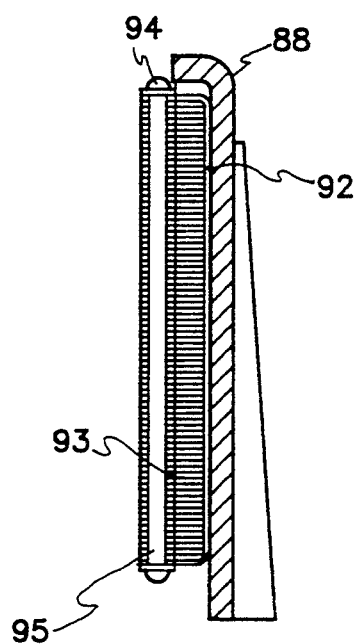
FIG. 11 is a cross-sectional view taken along line 6—6 of FIG., 10 showing a front view of detail of the radial aluminum cage and the laminated core.

Referring now to FIG. 4, the rare earth permanent magnet field poles 80, 81 are placed around the rotor disk assembly 61 in alternating polarity. Rare earth permanent magnets 80, 81 are formed in thin slices $\frac{1}{4}''$ to $\frac{1}{2}''$ thick. Such permanent magnets 80, 81 are very brittle when they are magnetized and easily break into small pieces when they are being transported or assembled on the rotor. The rare earth permanent magnets 80, 81 are assembled before magnetization into a low carbon shell 82 with all four flanges 85 bent over to keep the magnet in place on the rotor disk 84. The permanent magnet assembly 80, 81 is magnetized across the flat portion with a number of batches of alternating polarity as permanent magnet field pole piece assemblies 80, 81. Each permanent magnet assembly 80, 81 is cemented on one side of the rotor disk 84 and held equally spaced by an aluminum cage 83 which is riveted to the rotor disk 84 within a flange rim. Outer dual rotor disk assembly 61, 62 is provided with reinforcing gussets to prevent the rotor disk 84 from buckling as shown in FIG. 5 showing the dual rotor assembly.

In the dual rotor assembly 90, two single rotor disks 61, 62 are riveted or welded together back to back with both flanges facing outside. Both rotor disks 61, 62 are aligned with permanent magnets 80, 81 on each side offset by exactly one pitch distance at each side of the rotor disk 61, 62 such that the north pole assembly 80 is located exactly opposite the south pole assembly 81 on the opposite side of the dual rotor disk assembly 90. The dual rotor disk assembly 90 and, thus the two single rotor disks 61, 62, must be balanced to a minimum rotational speed of 5,000 rpm. Since the permanent magnet assembly 80, 81 is assembled and cemented on the dual rotor disk assembly 90 with in the separator cage 83 and closely fitted in the rotor disk flange rim perpendicular to the axis of rotation the stress concentration is minimized at a high centrifugal force at 5,000 rpm or higher on the edge of the permanent magnet field poles.

Figure 10:
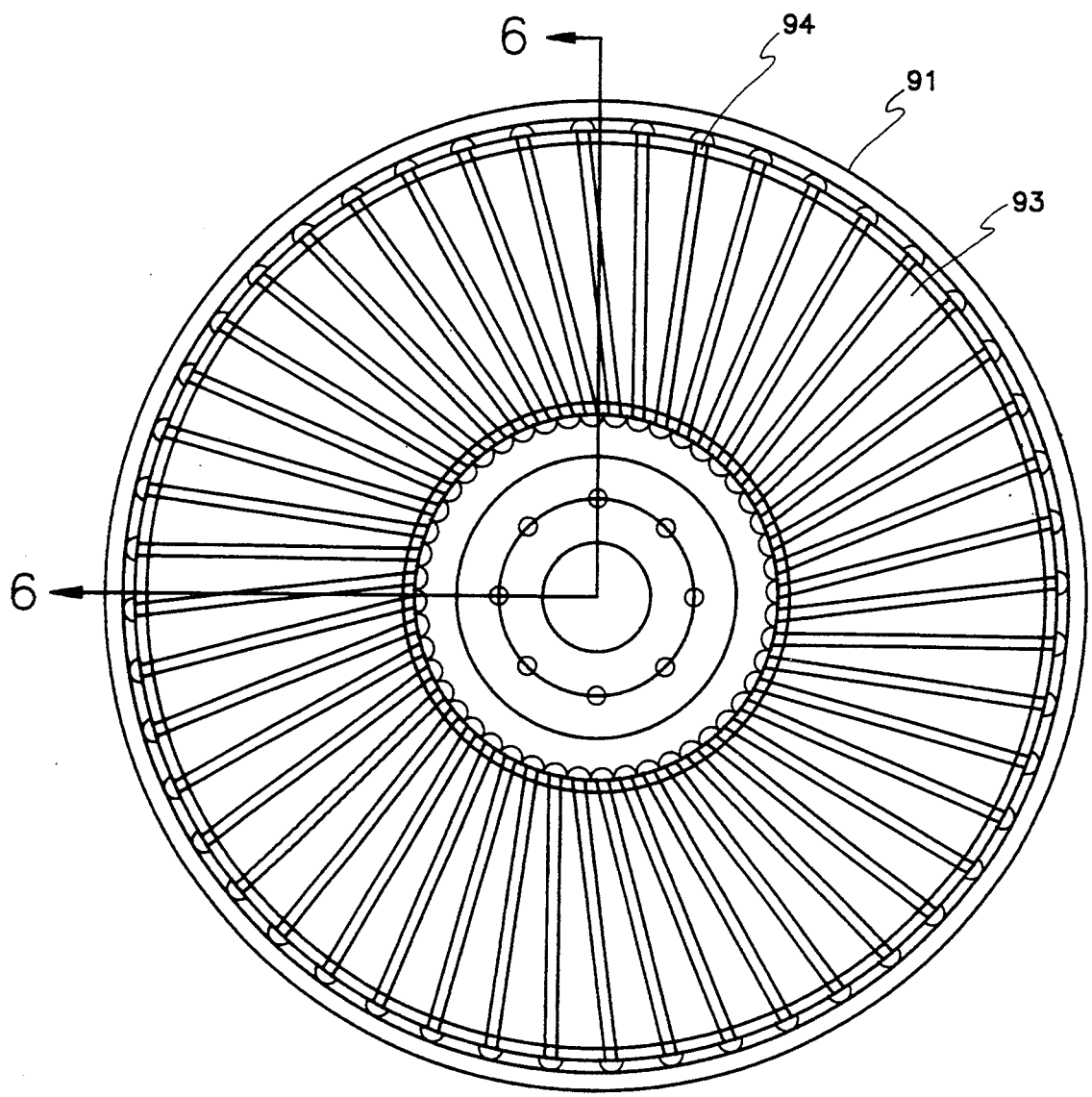
FIG. 10 is a cross-sectional view taken along line 1—1 of FIG. 3 showing a premanufactured rotor with a radial aluminum cage and a laminated core.
Figure 25:
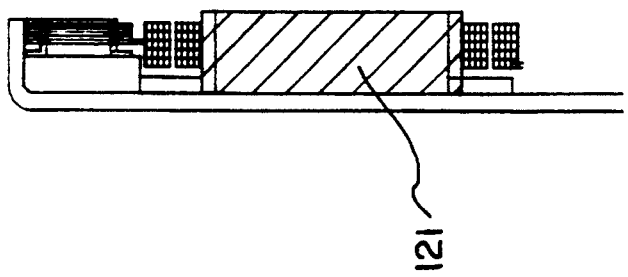
FIG. 25 is a cross-sectional view taken along line 13—13 of FIG. 24 showing a front detail view of a self-excited DC field pole.
Figure 19:
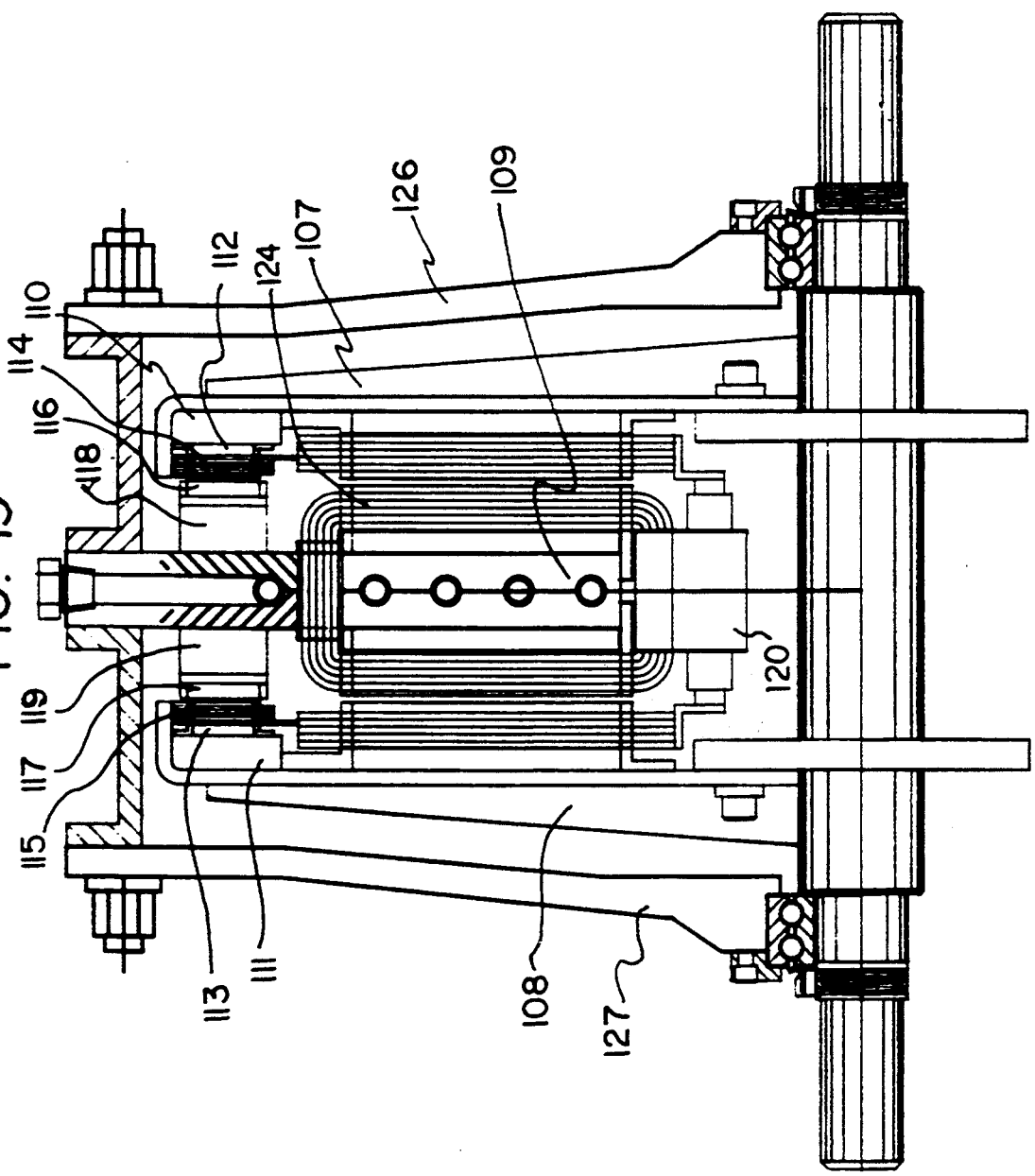
FIG. 19 is an enlarged view of the encircled portion of FIG. 18 showing greater detail of the single stator and the dual rotor with self-excited DC field poles.

The present invention covers a wide variety of polyphase brushless DC and AC synchronous motors and generators using permanent magnet field poles. However, there is a limiting factor for large size polyphase brushless DC and AC synchronous machines in which the maximum length and width of the permanent magnets are not to exceed the manufacturing capacity of a single piece of rare earth or lower grade permanent magnets.. It would also be very difficult to assemble a single piece permanent magnet 80, 81 on the rotor disk 61, 62 without breaking or chipping the permanent magnet 80, 81. Larger permanent magnets 80, 81 could be manufactured of smaller pieces of permanent magnet blocks 86 and assembled together into a nonmagnetic stainless steel shell 85 with a backup low carbon steel plate 87, then cemented and riveted to the rotor disk 61, 62 with an aluminum cage plate 89 within the rotor rim 88 with the space between the field poles 80, 81 possibly filled with epoxy as shown in FIG. 26. Smaller permanent magnets 80, 81 are assembled in a low carbon steel shell as shown in the enlarged view in FIG. 25. FIG. 10 shows a premanufactured rotor 61, 62 with a radial aluminum cage 94 and a laminated core 93 assembled within a low carbon steel channel 92 riveted within the rotor disk 61, 62 for most single-phase and polyphase discoidal AC induction machines.

Figure 13:
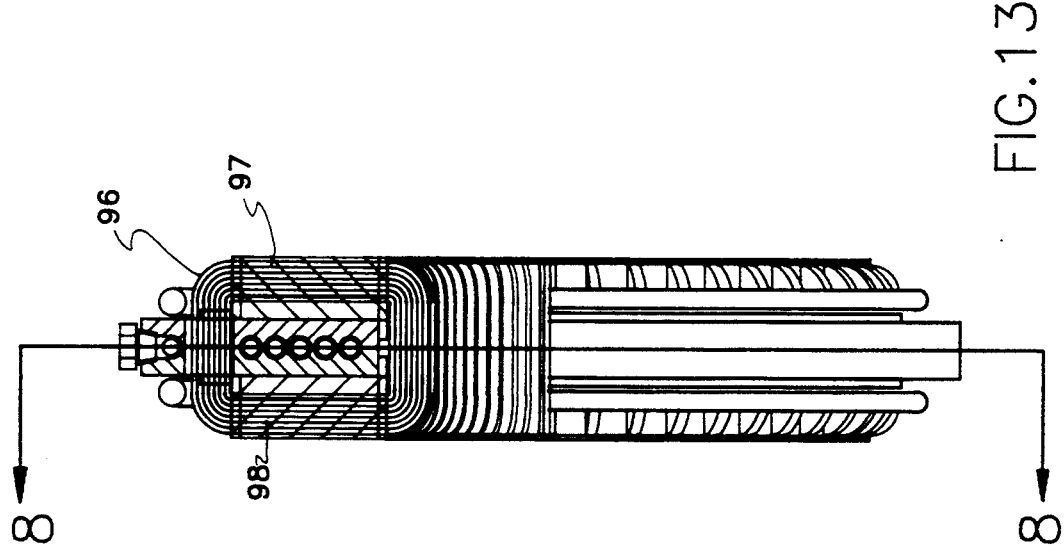
FIG. 13 is a partial cross-sectional view taken along line 7—7 of FIG. 12 showing a front view of detail of the cross-lamination windings and liquid cooled heat sink of the single stator.
Figure 12:
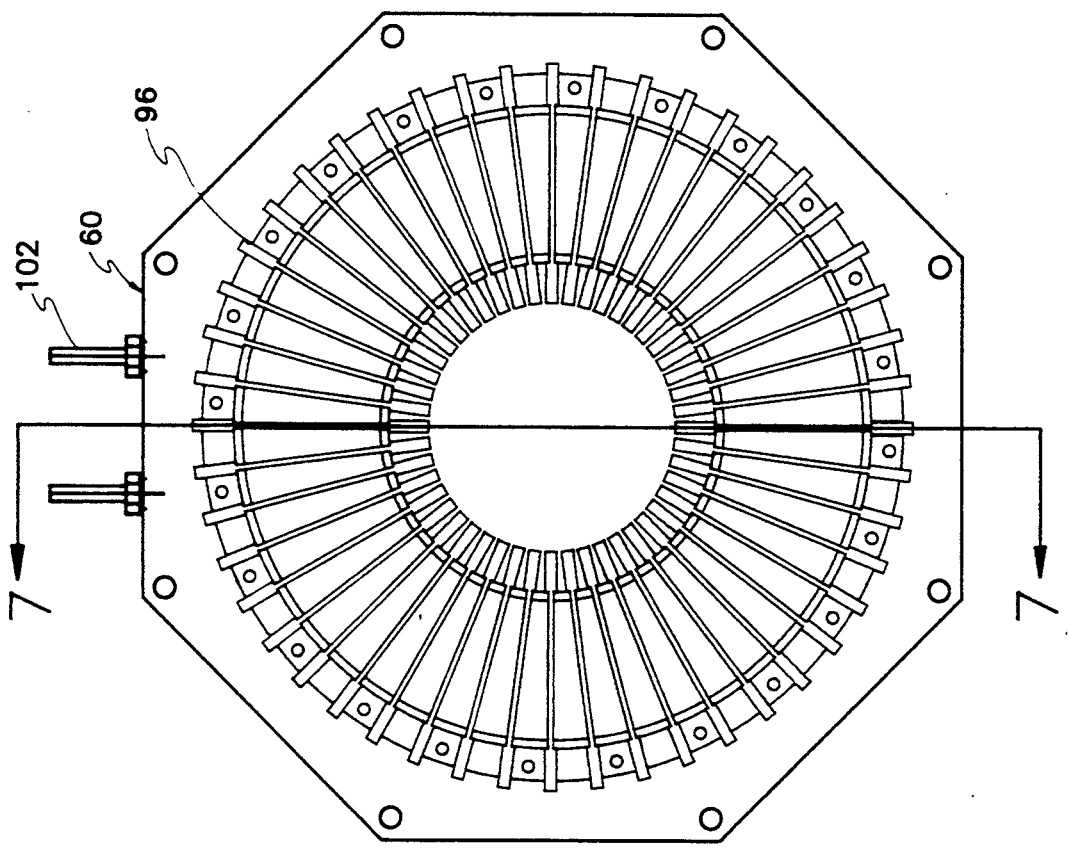
FIG. 12 is a cross-sectional view taken along line 2—2 of FIG. 3 showing a side view of the single stator assembly with cross-lamination windings and a liquid cooled heat sink.
Figure 14:
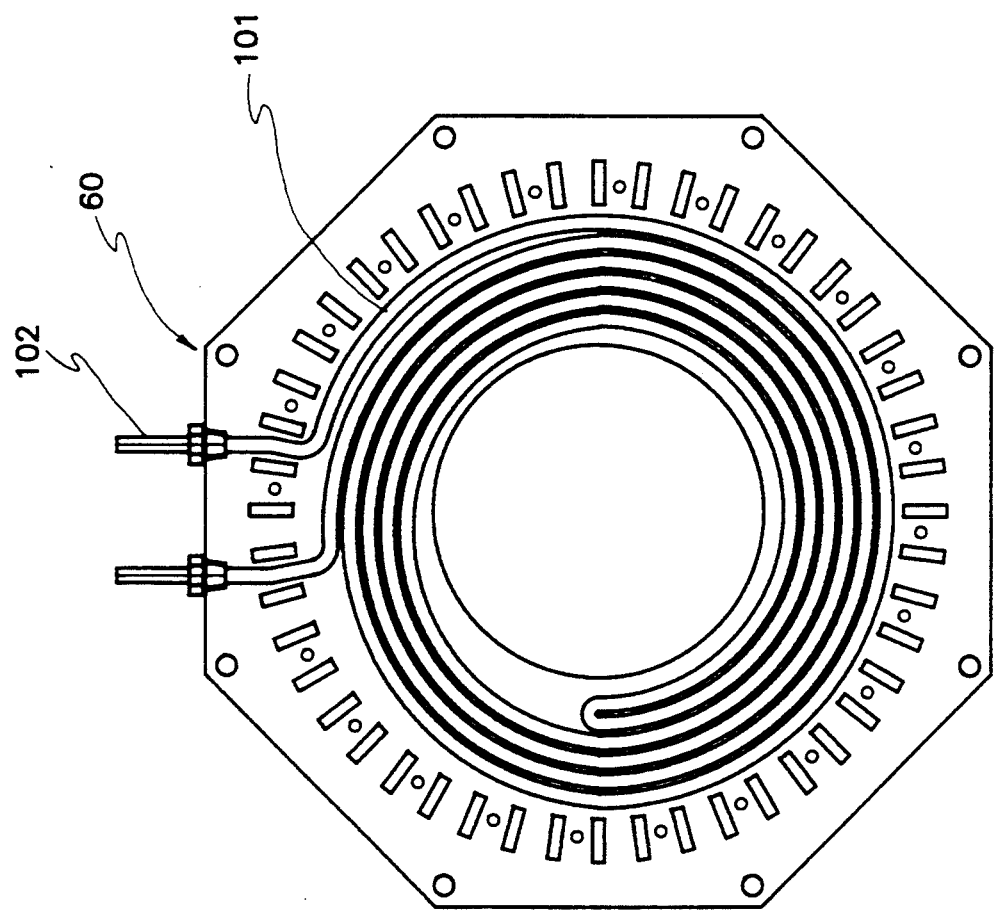
FIG. 14 is a cross-sectional view taken along line 8—8 of FIG. 13 showing a side view of detail of the liquid cooled heat sink of the single stator.
Figure 17:
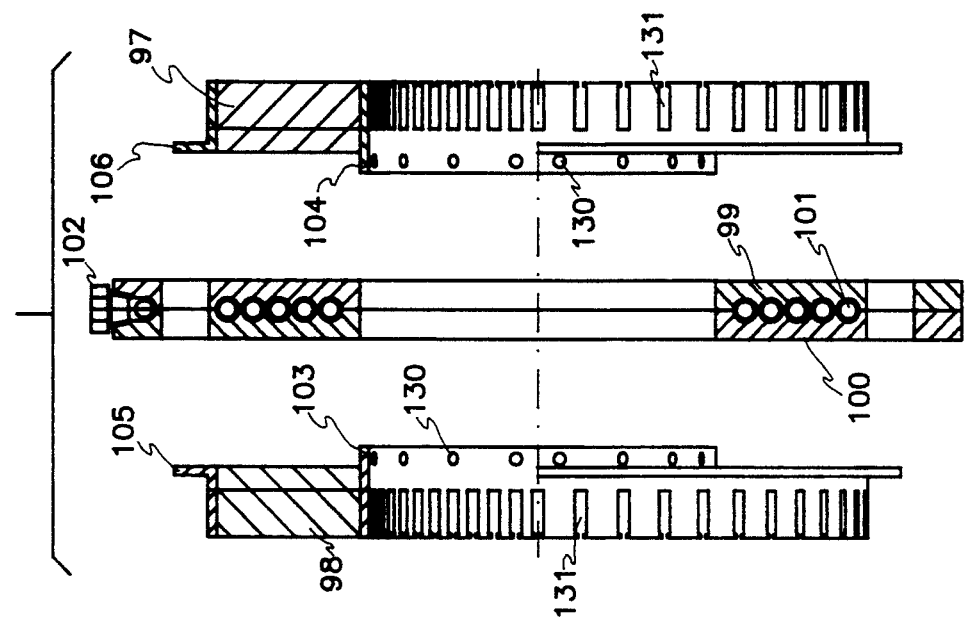
FIG. 17 is an exploded view of FIG. 16 showing greater detail of how the single stator is put together.
Figure 16:
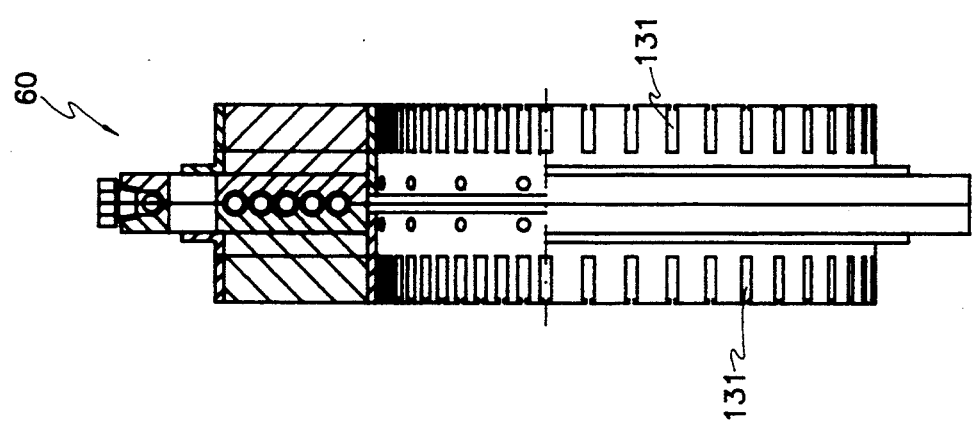
FIG. 16 is a cross-sectional view taken along line 9—9 of FIG. 15 showing detail of the rectangular slots of the single stator.
Figure 15:
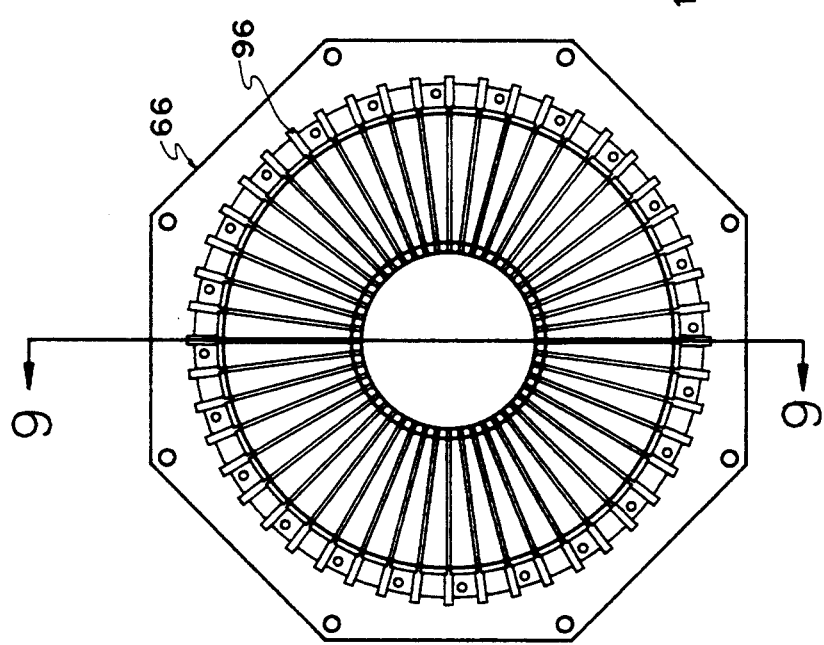
FIG. 15 is a cross-sectional view taken along line 2—2 of FIG. 3 showing a side view of the single stator assembly with cross-lamination windings of the single stator where the single stator has no liquid cooled heat sink.

Referring now to FIG. 12, a front view of the single stator assembly 60 shows the distribution of armature coils 96 within the toroidal stator assembly and the connection at the top of the stator assembly of the liquid or air cooled aluminum heat sink 101. The internal components of the armature coils 96, the laminated core 97, 98, the two halves of the central liquid or air cooled aluminum heat sink 99, 100 are exposed in FIG. 13. An exploded cross section along line 8—8 of FIG. 13 exposes the internal spiral copper tubing cooling element 101 and tube fitting 102 where the cooling copper tubing is laid within spiral grooves machined or precast in each half of the aluminum plates 99, 100 and the grooves and other surfaces are sprayed with heat conducting compound to fill the empty spaces for 100% contact between the cooling element 101 and each plate 99, 100 (See FIG. 14). Then, both aluminum plates 99, 100 are bolted or riveted together as a solid heat sink for maximum heat transfer.

Referring again to FIG. 13, the toroidal laminated core 97, 98 consists of an electrical silicon steel strip M-14, which has a 0.014" thickness with 5% silicon to reduce the hysteresis losses and the eddy current losses, tightly wound on an inner ring 103, 104 up to a 4" thickness or whatever other laminated core thickness is needed. Then, an angle ring 105, 106 is forced tightly onto the laminated core 97, 98 to keep the stack together and the solid stock is welded into V-grooves provided in several places on the top and the bottom with a narrow weld between the slots with both sides then ground to a smooth surface. Multiple holes 130 are drilled through the bottom of the laminated core 97, 98 and a solid steel rod is press fitted into the holes 130 to reinforce the laminated core 97, 98 and to prevent shear of the welds on the top and the bottom surfaces of ground laminated core assembly 97, 98. A plurality of rectangular slots 131 are machined on one side with an Electric Discharge Machine (EDM) across the laminated core 98. Both preassembled laminated core 97, 98 are assembled on the aluminum heat sink 99, 100. Both faces of the heat sink 99, 100 and the laminated core 97, 98 are sprayed with heat conductive compound for maximum heat transfer with the slots 131 in the laminated core 97, 98 and the rectangular wire clearance are lined up and then bolted together as a solid dual stator assembly 60. Preformed insulation is inserted in each slot 131 of the laminated core 97, 98 and the clearance holes of the heat sink with a rectangular magnet wire wound through both the slots 131 of the laminated core 97, 98 and the clearance holes in the heat sink such that the rectangular magnet wire is wound in layers. A thin layer of mica or equivalent heat insulation strip is layered between each turn of wire of the coil to reduce heat buildup within the armature coil 96.

The number of armature coils 96 in the stator 60 and the number of turns per coil are determined by the motor or generator design parameters. The number of armature coils 96 or the coils' pitch distance in the stator 60 is less critical in DC machines than in AC synchronous machines. At high voltages in AC synchronous machines when the armature coils 96 are close together, the magnetic leakage and the high voltage leakage which may occur at the bottom surface of the stator 60 where the coils 96 are much closer to each other and the laminated core 97, 98 and the rotor disk assembly 90 to reduce the AC electric and magnetic flux leakage, additional high voltage and magnetic insulation would be needed.

Figure 20:
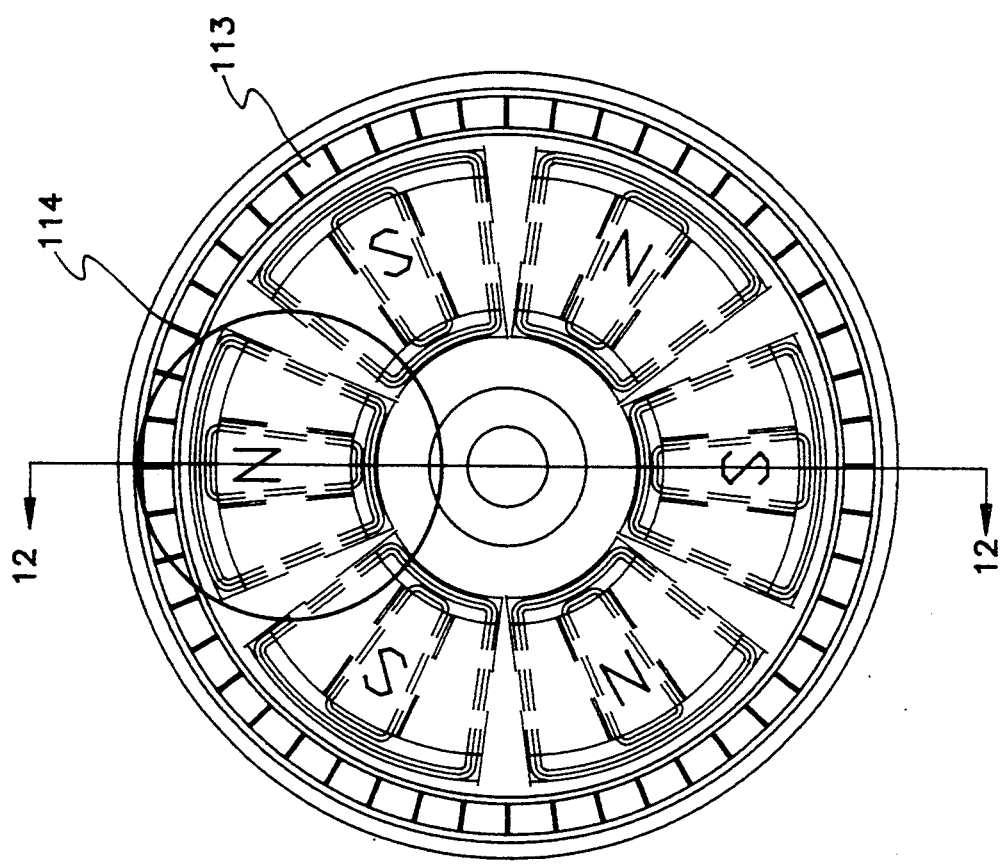
FIG. 20 is a cross-sectional view taken along line 10—10 of FIG. 18 showing a side view of a dual rotor with self-excited DC field poles.
Figure 18:
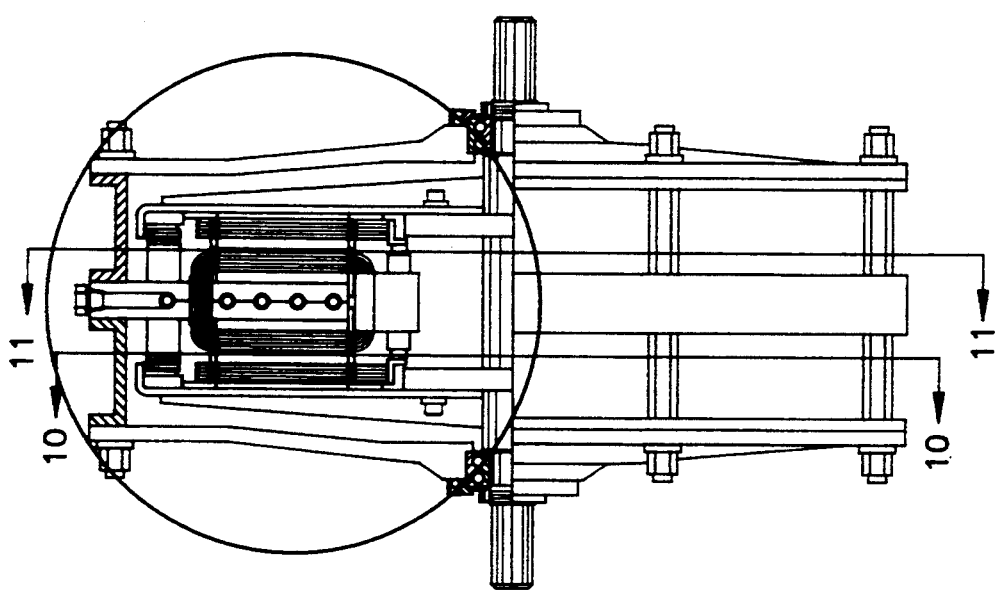
FIG. 18 is a front view of another embodiment of the polyphase discoidal brushless DC synchronous motor where the dual rotor have self-excited DC field poles.

Referring now to FIGS. 18–26, a two-stage polyphase brushless DC and AC synchronous machine with a large frame structure is shown which is beyond the conventional permanent magnet field pole manufacturing capacity with premanufactured self-excited DC field poles and dual field pole windings with single and dual rotors. A dual rotor disk assembly 107, 108, a dual stator assembly 109, an aluminum spacer ring 110, 111, and annular generator laminated core 112, 113, generator armature coils 114, 115, permanent magnet field poles 116, 117, annular aluminum spacer rings 118, 119 and starting contact brush relay assembly 120 is shown in enlarged detail in FIG. 19. A face view of rotor assembly exposing prewound self-excited DC field pole winding assembly 121 and secondary annular DC generator assembly 113 with armature coils 114, primary field pole windings 122, secondary field pole windings 123 and field coil spacer iron bars 124, 125 are shown in FIG. 20. The reason for the dual field pole windings is to increase and evenly distribute the magnetic flux circulation over the entire area of the field pole core since it would otherwise require twice the amount of current and a larger size conductor for the coil to generate a similar flux pattern. Two slots are cut on top next to the secondary to split the magnetic flux cancellation between the primary and the secondary field pole windings 122, 123. The slots for the field pole windings 122, 123 are precut at the bottom of the laminated core 112, 113 and assembled with iron boar stock for magnetic flux circulation. The field pole windings 122, 123 are attached on top to the DC generator circuits and at the bottom to an annular collector bar which serves to start the machine from a power supply through a contact brush relay. Then, once the rotor attains at least 30% of its full speed, the contact relay switches to self-excited DC generator current. A self-excited field pole generator is prewound and preassembled within an annular low carbon steel channel which is assembled on the rotor disk.

Figure 22:
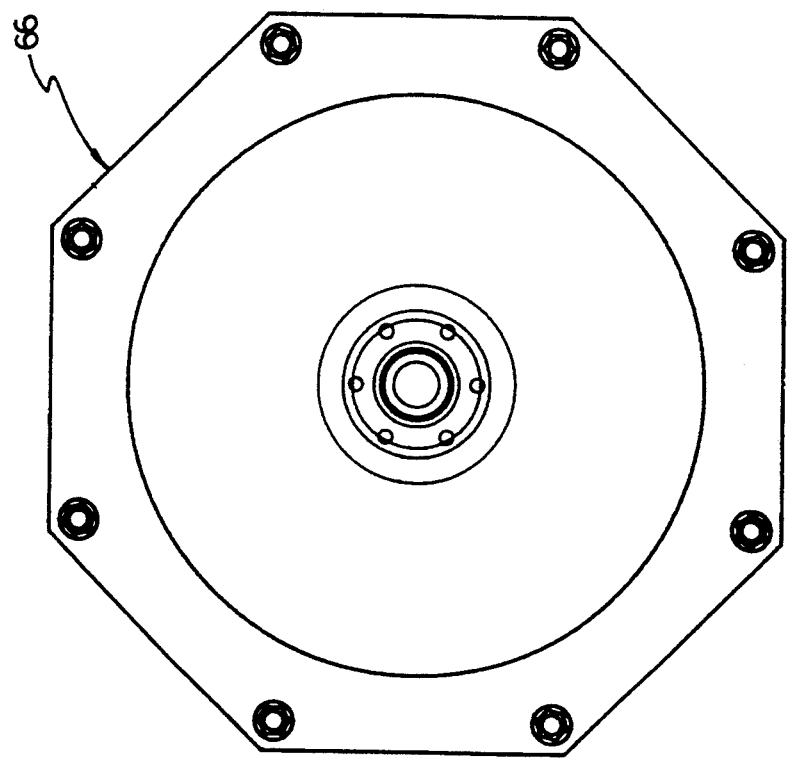
FIG. 22 is a side view of the polyphase discoidal brushless DC synchronous motor.
Figure 21:
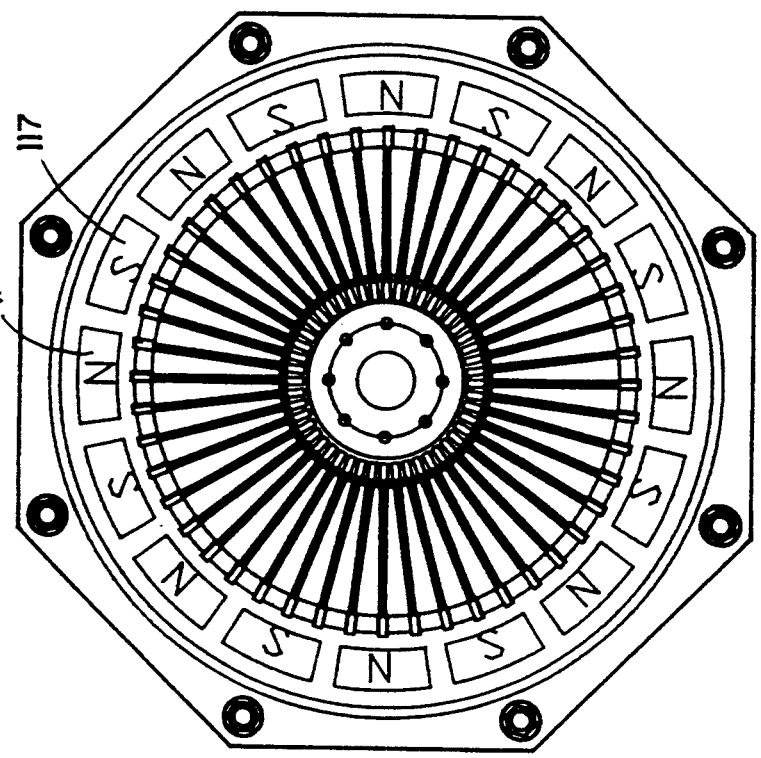
FIG. 21 is a cross-sectional view taken along line 10—10 of FIG. 18 showing another embodiment of a dual rotor with self-excited DC field poles.

FIG. 21 shows a plan view of dual stator assembly 109 and annular self-excited field pole assembly 118, 119 with a distribution of permanent magnets 116, 117 with alternating polarity assembled within a low carbon steel channel an mounted on both sides of the heat sink. A plan view of aluminum end plate 126, 127 is shown in FIG. 22 and a cross section along line 12—12 of FIG. 20 showing a dual rotor assembly 107, 108 on a single output shaft is shown in FIG. 23.

Figure 28:
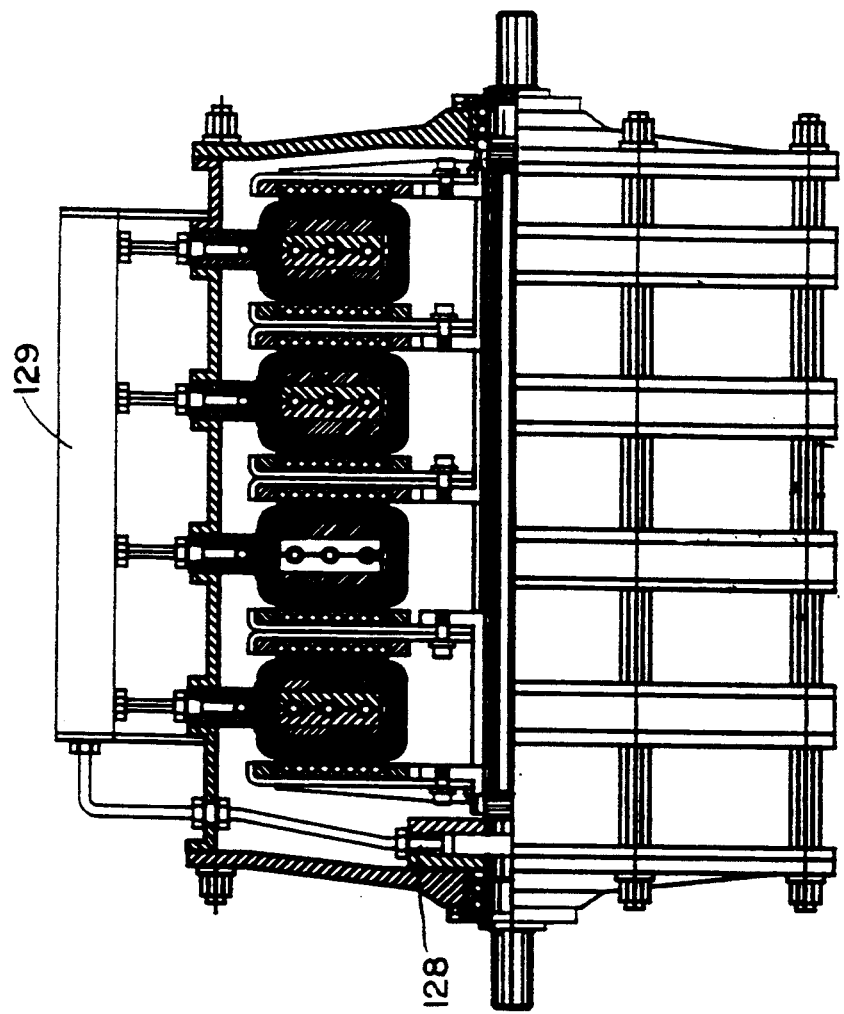
FIG. 28 is a front view of a four-stage polyphase discoidal brushless DC synchronous motor with a cooling radiator located on top of the motor with a partial cutaway showing detail of the four stages.
Figure 27:
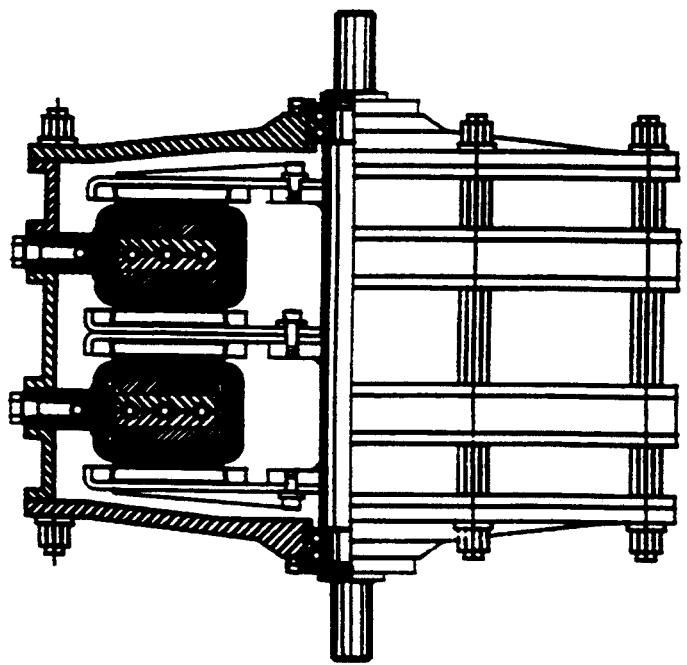
FIG. 27 is a front view of a two-stage polyphase discoidal brush less DC synchronous motor with a partial cutaway showing detail of the two stages

FIG. 27 is a partial cutaway view of a two-stage polyphase brushless DC or AC synchronous machine assembled in a multistage configuration on a single output shaft. FIG. 28 is a partial cutaway view of a four-stage polyphase brushless DC or AC synchronous machine assembled in a multistage configuration on a single output shaft with a commercially available internal hydraulic pump 128 and an external heat exchanger 129 for closed-loop recirculation fluid cooling system is mounted on the top of the machine. In the multistage machine configuration, the overall motor torque characteristics are not based on the size of the frame structure but rather on the flux density developed between each dual stator and rotor, the number of armature coils in the stator, the number of amperes per turn per coil, the type and size of rare earth permanent magnet or conventional ceramic magnets and the magnetic flux density within the air gap. The size of multistage machines could be 50% or more smaller and lighter compared to any conventional DC or AC machine of the same power rating.

Other combinations of open end cylindrical polyphase brushless DC or AC synchronous machines with magnetic frictionless bearings are also possible such as a multistage open end cylindrical machine with internal or external air or hydraulic pumps or compressors with integrated variable pitch blades, a two-stage open end cylinder with an external or internal driven cylinder, a large diameter open end internal driven cylinder ranging from a one foot inside diameter to a twenty or thirty foot inside diameter. In large diameter machines, the rotor may have a full diameter assembled out of several sections such as three or four short sections spaced at 120 degrees apart to reduce the weight at reduced torque. The rotor disk is bolted to an internal annular base having on both sides a forty-five degree bevel in which the grooves are machines containing a cemented continuous section of permanent magnet strips with the poles facing out. The stator heat sink can also be extended with a forty-five degree bevel with an equal size of permanent magnet strip cemented in the groove of the same polarity as the permanent magnet rotor strip. Since the two permanent magnets of the same polarity repel each other with equal magnetic strength creating magnetic frictionless bearings, the rotor is maintained radially and axially between the dual stator with a minimal air gap. Such an open end cylinder polyphase DC or AC synchronous or other combinations of machines could also be open structure or completely sealed for a long life with maintenance free operation.

Figure 29:
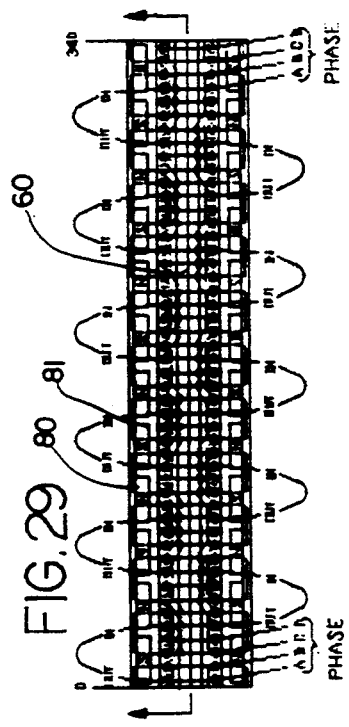
FIG. 29 is a view of the dual rotor and the single stator of FIG. 3 showing a simplified developed view of the polyphase DC synchronous machine armature coil connections and magnetic flux circulation of the single stator and the dual rotor assembly and the distribution of the armature coils in a series wave connection configuration.
Figure 30:
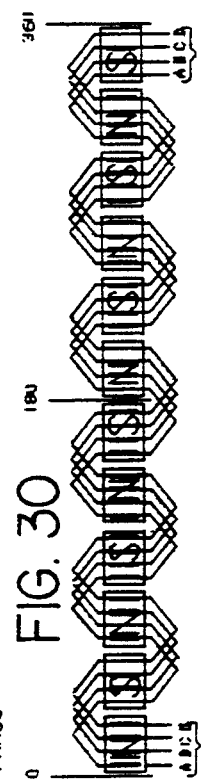
FIG. 30 is a view of a four-phase AC synchronous induction machine connection in a four group distribution of armature coils interconnection of a closed loop system.
Figure 31:
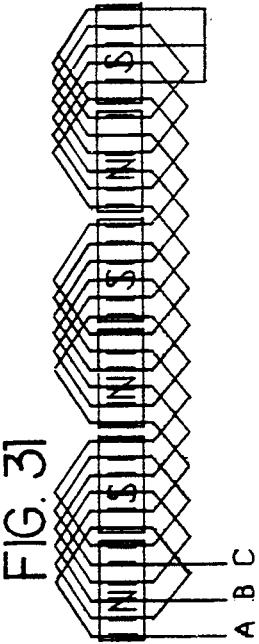
FIG. 31 is a view of a three-phase AC synchronous motor with the closed-loop three-wire characteristics of a three-wire system.
Figure 32:
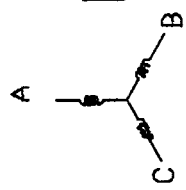
FIG. 32 is a schematic of a typical closed-loop three-wire system.
Figure 33:
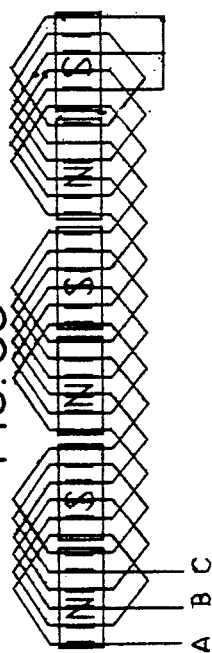
FIG. 33 is 8 view of a three-phase AC synchronous motor with the open-loop four-wire characteristics of a four-wire system.
Figure 34:
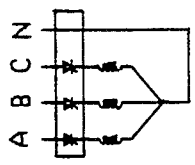
FIG. 34 is a schematic of a typical open-loop four-wire system.

A simplified partial cross section view of FIG. 3 with the single stator assembly 60 and the dual rotors 61, 62 is developed into a flat view of the 360 degree circumference shown in FIG. 29 showing the distribution of the twelve permanent magnet field poles 80, 81 with alternating polarity on both sides of the stator 60 and the magnetic flux circulation between the each half of the dual rotor assembly 61, 62 and the stator 60 with the armature coil connection in a four-phase series configuration also being shown. A cross section taken along line 15—15 of FIG. 29 showing the armature coil connection and distribution over permanent magnet field poles of a four-phase DC synchronous machine configuration is shown in FIG. 30. A three-phase AC synchronous induction machine with 36 armature coils connected in series/parallel in a two group distribution over six permanent magnet field poles in a closed-loop system are shown in FIG. 31 in which the revolving flux is directly proportional to the frequency of the supply voltage and inversely proportional to the number of the pairs of poles while this configuration is shown in schematic form in FIG. 32. An identical three-phase AC synchronous machine configuration with 36 armature coils connected in parallel to a common return fourth wire in a two group distribution over six permanent magnet field poles in an open loop system is shown in FIG. 33 while this configuration is shown in schematic form in FIG. 34. Connecting a three-phase "Y" common point to neutral thereby opening the closed-loop system would change the whole three-phase AC synchronous induction machine characteristics such that the conventional synchronous speed or revolving flux which was proportional to the supply voltage no longer exists and the rotational speed no longer is inversely proportional to the number of pole pairs on the rotor but, rather, the rotational shaft speed is now directly proportional to the frequency of the supply voltage. Instead of having an expensive three-phase inverter, a variable frequency controller can be used to operate the synchronous machine at a variable shaft speed or a conventional inverter can be used to convert an AC power supply output to DC power such that a three-phase synchronous system will operate at a variable shaft speed. In FIG. 33, instead of using a rotor with permanent magnets or self-excited DC field poles, the rotor could be replaced by a radial cage rotor and the machine would operate as a three-phase AC induction motor.

Figure 35:
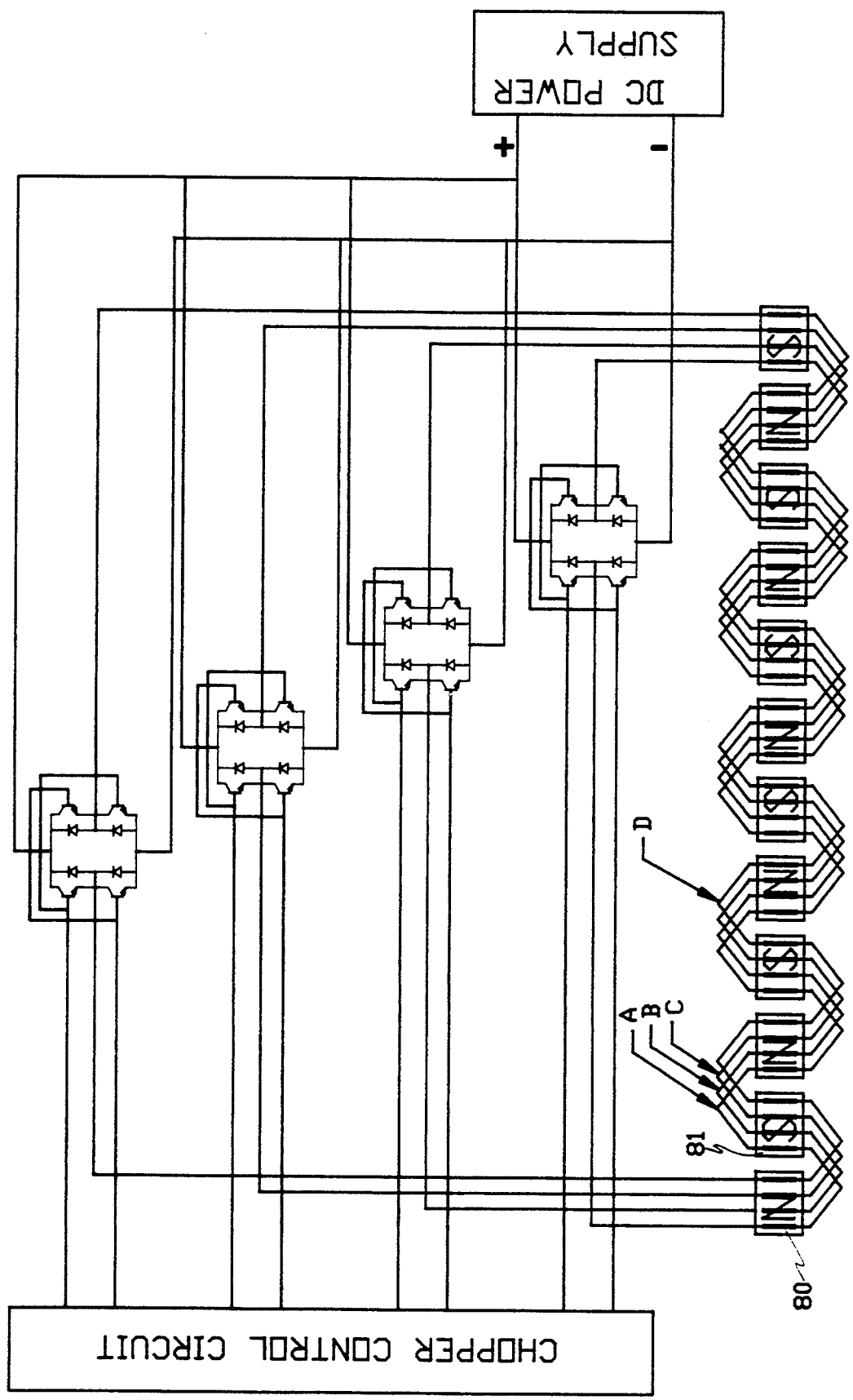
FIG. 35 is a schematic of a conventional chopper "H" bidirectional bridge and sequential power switching circuit in a parallel polyphase configuration.
Figure 36:
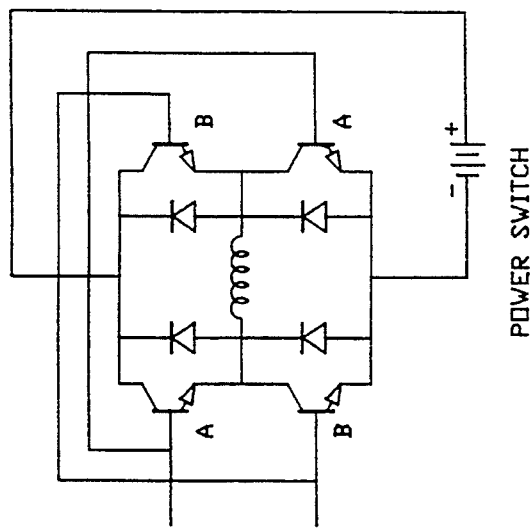
FIG. 36 is a schematic of a conventional power switch for use with the polyphase discoidal brushless DC synchronous machine.
Figure 37:
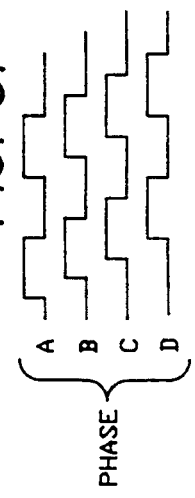
FIG. 37 is a schematic showing the relationship between the four phases of a four-phase discoidal brushless DC synchronous machine.
Figure 38:
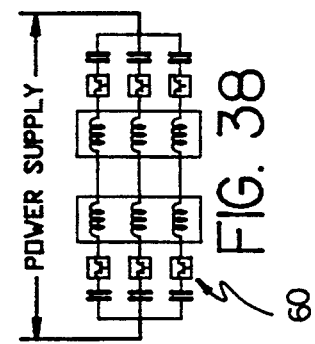
FIG. 38 is a schematic of a single stator for a three-phase discoidal brushless DC synchronous machine including the power switches for each phase.
Figure 39:
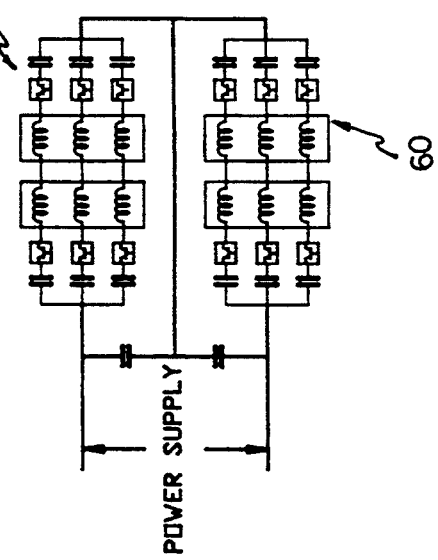
FIG. 39 is a schematic of a four-stage series connection with phase and stage power switches.

A schematic of a commercially available chopper "H" bidirectional bridge (See FIG. 35) and a sequential power switching circuit (See FIG. 36) are shown where each phase of a polyphase brushless DC or AC synchronous machine may be connected parallel to the power supply through the chopper bridge and the sequential power switching circuit. A four-phase chopper input signal is shown in FIG. 37. A schematic of a three-phase with two single or two dual stages (See FIG. 38) and four single or four dual stages (See FIG. 39) are connected in series into a DC synchronous machine in which each phase can be switched on or off.

It is to be understood that the present invention is not limited to the embodiments described above, but encompasses any and all embodiments within the scope of the claims.

I claim:

1. A discoidal brushless induction motor-generator comprising:
   dual stators sandwiching a rotor, containing multiple permanent magnets, and connected to a shaft having a shaft axis, each of said stator further comprising;
      a toroidal lamination core, including a core axis collinear with said shaft axis, said lamination core having a plurality of core slots defining an annular region, wherein the circumferential distance between adjacent core slots defines a slot pitch;
      a plurality of armature coils wound across said lamination core and through said core slots wherein;
         each said armature coil comprises a wire wound in multiple turns, said turns of wire being insulated from adjacent turns of said wire and from said lamination core;
      said wire forming each of said armature coils having two wire ends terminating on the outer surface of said dual stators and connected to wire ends of other of said armature coils and ultimately to switching and control means;
   each of said armature coils being series connected over a predetermined number of slot pitches; whereby
   a magnetic flux of alternating polarity in each of said armature coils may be generated by a current flow through said wires of said armature coils; and
   each of said dual stators being mounted on one side to a liquid cooled heat sink, whereby said heat sink cools said plurality of armature coils and said toroidal lamination cores of both stators;
   said permanent magnets being located on each of two sides of said rotor.

2. A discoidal brushless induction motor-generator according to claim 1 wherein;
   each said turn of wire is shaped like a rectangle with slightly rounded corners.

3. A discoidal brushless induction motor-generator according, to claim 1 wherein;
   said core is comprised of two aluminum half shells with complementary spiral grooves and copper tubing enclosed within said grooves and attached to said grooves with a material of high heat conductivity wherein;
   liquid coolant from said liquid cooled heat sink flows through said copper tubing.

4. The discoidal brushless induction motor-generator according to claim 1 further comprising;
   an open frame structure having generally cylindrical ends which comprise;
      support bearings for said shaft and
      conduits and connections for said liquid cooled heat sink, wherein the liquid used in said liquid cooled heat sink is water and
   multiple ring sections between said cylindrical ends for enclosing the outer periphery of said motor-generator, wherein one of said ring sections includes a base support means.

5. The discoidal brush less induction motor-generator according to claim 4, wherein said open frame structure is made of aluminum so as to reduce the overall weight.

6. The discoidal brushless induction motor-generator according to claim 1, wherein said permanent magnets are mounted to said rotor within a close fitting aluminum cage plate so as to allow high rotational speeds with little stress concentration on said permanent magnets.

7. The discoidal brushless induction motor-generator according to claim 1, wherein said permanent magnets are pre-assembled within annular low carbon steel U-channels which are in turn attached to said rotor.

8. The discoidal brushless induction motor-generator according to claim 1, wherein every predetermined number of said armature coils is wired in series to produce N a polyphase alternating current when said shaft and said disk rotor are driven by an external torque.

9. A discoidal brushless induction motor-generator comprising:
   a single stator sandwiched between dual rotors containing multiple permanent magnets connected to a shaft having a shaft axis, said stator further comprising;
      a toroidal lamination core, including a core axis collinear with said shaft axis, said lamination core having a plurality of core slots defining an annular region, wherein the circumferential distance between adjacent core slots defines a slot pitch;
      a plurality of armature coils wound across said lamination core and through said circumferentially arranged core slots wherein;
         each said armature coil comprises a wire wound in multiple turns, said turns of wire being insulated from adjacent turns of said wire;
         said wire forming each of said armature coils having two wire ends terminating on the outer surface of said stator and connected to wire ends of other of said armature coils and ultimately to switching and control means;
      each of said armature coils being series connected over a predetermined number of slot pitches; whereby
      a magnetic flux of alternating polarity in each of said armature coils may be generated by a current flow through said wires of said armature coils; and
      said magnetic flux of said armature coils facing an opposing polarity of one of said permanent magnets on an adjacent rotor;
      said stator being centrally connected to a liquid cooled heat sink, whereby said heat sink cools said plurality of armature coils and said toroidal lamination cores of said stator;
      said permanent magnets being located on each of two sides of said rotors and are separated by a minimal air gap from a complementary side of said stator.

10. A discoidal brushless induction-motor-generator according to claim 9 wherein;
    each said turn of wire is shaped like a rectangle with slightly rounded corners.

11. The discoidal brushless induction motor-generator according to claim 9 further comprising;
    an open frame structure having generally cylindrical ends which comprise support bearings for said shaft and
    multiple ring sections between said cylindrical ends for enclosing the outer periphery of said motor-generator, comprising;
       ring section with a base support means, and
       other ring sections including conduits and connections for said stator and said liquid cooled heat sink.

12. The discoidal brushless induction motor-generator according to claim 11, wherein said open frame structure is made of aluminum so as to reduce the overall weight.

13. The discoidal brushless induction motor-generator according to claim 9, wherein said permanent magnets are mounted to one side of each of said rotors within a close fitting aluminum cage plate so as to allow high rotational speeds with little stress concentration on said permanent magnets.

14. The discoidal brushless induction motor-generator according to claim 9, wherein said permanent magnets are pre-assembled within annular low carbon steel U-channels which are in turn attached to one side of each of said rotors.

15. The discoidal brushless induction motor-generator according to claim 9, wherein every predetermined number of said armature coils is wired in series to produce a polyphase alternating current when said shaft and said disk rotor are driven by an external torque.

16. A discoidal brushless induction motor-generator comprising a series of motor-generators as in claim 1 cascaded end to end along a single shaft so as to multiply the torque produced on said shaft when connected as a motor or to multiply the current generated when connected as a generator.

17. A discoidal brushless induction motor-generator comprising a series of motor-generators as in claim 9 cascaded end to end along a single shaft so as to multiply the torque produced on said shaft when connected as a motor or to multiply the current generated when connected as a generator.

18. A polyphase machine comprising:
    a rotor, comprising multiple magnet means, said rotor being connected to a shaft having a shaft axis;
    a stator comprising;
       a lamination core, including a plurality of core slots;
       a plurality of armature coils wound across said lamination core and through said core slots;
          wherein said armature coil further comprises a wire wound in multiple turns, said turns of wire being insulated from adjacent turns of said wire and from said lamination core;
       said wire including wire ends terminating on an outer surface of said stator and connected in series to the wire ends of other armature coils;
       said plurality of said armature coils being connected to one another in series;
    wherein said stator includes a heat sink means for dissipating heat from said stator.

19. A polyphase machine according to claim 18 wherein
    said heat sink means includes two aluminum half shells having complementary spiral grooves; wherein said grooves include tubing means for circulating a liquid coolant.

20. A polyphase machine according to claim 18 wherein said rotor is a dual rotor sandwiching said stator.

* * * * *